INVENTORS.
Joseph M. Gwinn, Jr.
Angus J. O'Brien.
BY William R. Shireman.
Carnes, Dickey & Pierce.
ATTORNEYS.

United States Patent Office 3,031,779
Patented May 1, 1962

3,031,779
FRONT-MOUNTED POWER CONTROL UNIT
FOR BULLDOZER
Joseph M. Gwinn, Jr., Dearborn, and Angus J. O'Brien, Birmingham, Mich., and William R. Shireman, Findlay, Ohio, assignors to Gar Wood Industries, Inc.
Filed June 12, 1958, Ser. No. 741,703
8 Claims. (Cl. 37—144)

This invention relates generally to tractors provided at one end with a dozer blade or the like and more particularly to a power control unit which is mounted on such a tractor for raising and lowering the dozer blade. This application is a continuation in part of my copending application Serial No. 658,746, filed May 13, 1957, now abandoned.

Commercial tractors of the kind used for earth moving and similar operations are commonly provided with front end power control apparatus for raising and lowering equipment mounted on the front end of the tractor. Such is the case with both the conventional single engine tractors and the twin-type "TC-12" tractors manufactured by the Euclid Division of General Motors Corporation of Detroit, Michigan, illustrated in the drawing. The power control apparatus includes either a cable and sheave-type power output or a hydraulic cylinder assembly type output which are applied to the tractor either in the field or at the factory. In the past, such units have consisted of a plurality of parts which must be separately mounted on the tractor, usually at the factory by skilled technicians. Furthermore, by virtue of the construction of these prior units, some of the parts have been located at lower positions on the tractor front end where they readily become jammed with rocks, dirt and the like.

An object of this invention, therefore, is to provide an improved power control unit which is readily applied to the front end of a tractor either at the factory or in the field.

A further object of this invention is to provide a power control unit which is constructed so that when it is mounted on the tractor substantially all parts of the unit are at an elevated position on the tractor so as to be out of the path of rocks, dirt, and other material which oftentimes pile up in the vicinity of the tractor front end when the tractor is used for dozing operations and the like.

Another object of this invention is to provide a front end housing or nose guard for a tractor which is adapted to support and house either a winch-type power transmission mechanism for a cable and sheave output or a pump, tank and valve mechanism for transmitting power to a hydraulic cylinder-type power output.

A further object of this invention is to provide a power transmission unit for a cable and sheave-type output which is mounted as a pre-assembled unit on the tractor by merely bolting a cover plate on the unit to a housing on the tractor.

A further object of this invention is to provide a unit for transmitting power from the tractor engine to a hydraulic cylinder-type power output which unit is mounted as a pre-assembled package on the tractor by merely bolting a cover plate on the unit to a housing on the tractor.

Still a further object of this invention is to provide a power control unit which is relatively simple in construction, economical to manufacture and efficient in operation in raising and lowering tractor front end equipment.

Further objects, features and advantages of this invention will become apparent from a consideration of the following description, the appended claims and the accompanying drawing in which:

FIG. 6 is a diagrammatic view showing the cable arrangement in the unit shown in FIG. 1;

FIG. 7 is an enlarged elevational view of the sheave support illustrated in FIG. 2 on the rear side of the dozer blade;

Figures 1, 2:
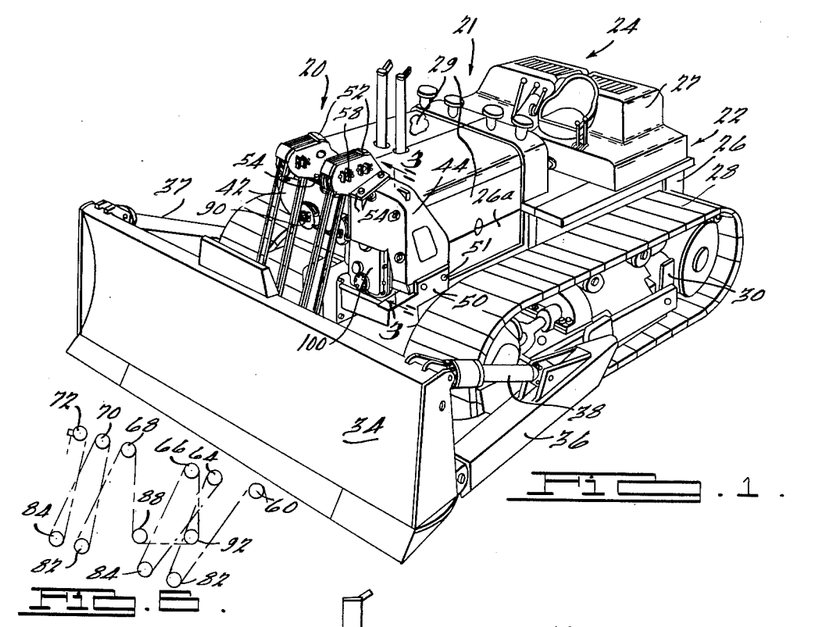
FIG. 1 is a perspective view of a twin-type crawler tractor provided with the form of the power control unit of this invention which operates a cable and sheave-type output.
FIG. 2 is a side elevational view of the tractor and power control unit shown in FIG. 1.

With reference to the drawing, one form of the power control unit of this invention, indicated generally at 20, is illustrated in FIG. 1 mounted on the front end of a "TC-12" crawler-type tractor 21. It is to be understood, however, that the power control units of this invention are equally adapted for any tractor and are shown and described with respect to the "TC-12" because it includes all of the elements of a conventional single engine tractor. As is well known, the twin-type of tractor consists of a pair of side-by-side sections 22 and 24, each of which is provided with a main frame 26 which supports a radiator 27, a track 28, and an engine 29 supported on a forward portion 26a of the frame 26. The frames 26 for the sections 22 and 24 are connected for limited relative rotation about an axis extended transversely of the tractor and located approximately at the position indicated at 30.

A dozer attachment, indicated generally at 32 is illustrated in FIGS. 1 and 2 mounted on the tractor 21. The attachment 32 includes an upright dozer blade 34, of usual type, supported on the front end of a pair of arms 36 which are pivotally connected at their rear ends to opposite sides of the tractor 21.

A pair of blade adjusting struts 37 and 38, corresponding to the arms 36, extend between the arms 36 and the upper end of the blade 34. The strut 38 includes a manually adjustable pump and cylinder assembly 40 for extending and retracting the strut 38 to adjust the inclination of the blade 34 transversely of the tractor 21.

The control unit 20 includes a pair of substantially identical housings 42 and 44, corresponding to and mounted on the tractor sections 22 and 24. Each housing 42 or 44 is mounted on the engine portion 26a of the corresponding tractor frame section 26 forwardly of the corresponding engine 29. Each of the housings 42 and 44 includes a hollow main or rear part 46 which has an open front end and is of a shape to conform to the overall outline of the tractor 21 (FIG. 2) and provide the tractor with the desired side silhouette. A pair of mounting plates 50 on transversely opposite sides of each part 46 are connected to the tractor frame portions 26a and carry pairs of inwardly extending pins 51 which fit in openings in the housing parts 46. As a result, either of the housings is readily removed or installed as desired by merely pulling or inserting the pins 51 on the corresponding mounting plates 50.

Mounted on the upper end of each of the housing parts 46 is a sheave supporting unit 52 releasably connected to the housing by means of bolts 55 (FIG. 4) extended through a mounting plate 54 formed on the units 52. Each supporting unit 52, FIGS. 1, 3 and 4, includes four upright uniformly spaced plates 56 having provision for supporting a pair of parallel shafts 58 extended laterally thereof. The unit 52 for the housing 44 carries a pair of shafts 58 (FIG. 3) which are spaced apart in a direction longitudinally of the tractor 21 for supporting corresponding sheaves which are likewise spaced longitudinally of the tractor. The unit 52 for the housing 44 supports three sheaves 60, 64 and 66, as indicated diagrammatically in FIG. 6, corresponding to and positioned within the three sheave chambers 62 formed between the plates 56. The sheave 60 is supported on the rear one of the shafts 58 and the sheaves 64 and 66 are supported side by side on the forward shaft 58.

The sheave-supporting unit 52 for the housing 42 has only a single shaft 58, corresponding to the forward shaft in the unit 52 for the housing 44. The unit 52 for the housing 42 has a rear opening for a shaft 58 only for the purpose of maintaining the sheave-supporting units 52 of a uniform character so that they are interchangeable on the housings 42 and 44. A pair of sheaves, 68 and 70, and a cable anchor block 72, are supported on the single shaft 58 and are separated by the plates 56 in the supporting unit 52.

A pair of sheave-supporting units 74, only one of which is shown, corresponding to the units 52, are carried on a rearwardly projecting support 76 (FIG. 2) provided on the dozer blade 34. Each unit 74 includes a transverse sheave-supporting shaft 78 and is pivotally mounted on the support 76 by means of a universal joint assembly 80 which provides for tilting of the unit 74 in response to tilting of the blade 34 in a direction transversely of the tractor 71. In each universal joint assembly 80, the support 76 carries a socket 79 (FIG. 7) for a semi-ball shape head 81 on one end of a bolt 83, the opposite end of which is secured by a nut 85 to the unit 74. A spring 87 encircles the bolt 83 and extends between the unit 74 and the support 76 for resiliently holding the unit 74 away from the support 76. A pair of sheaves 82 and 84 are mounted in a side-by-side relation on the shaft 78 for each of the units 74.

Figure 5:
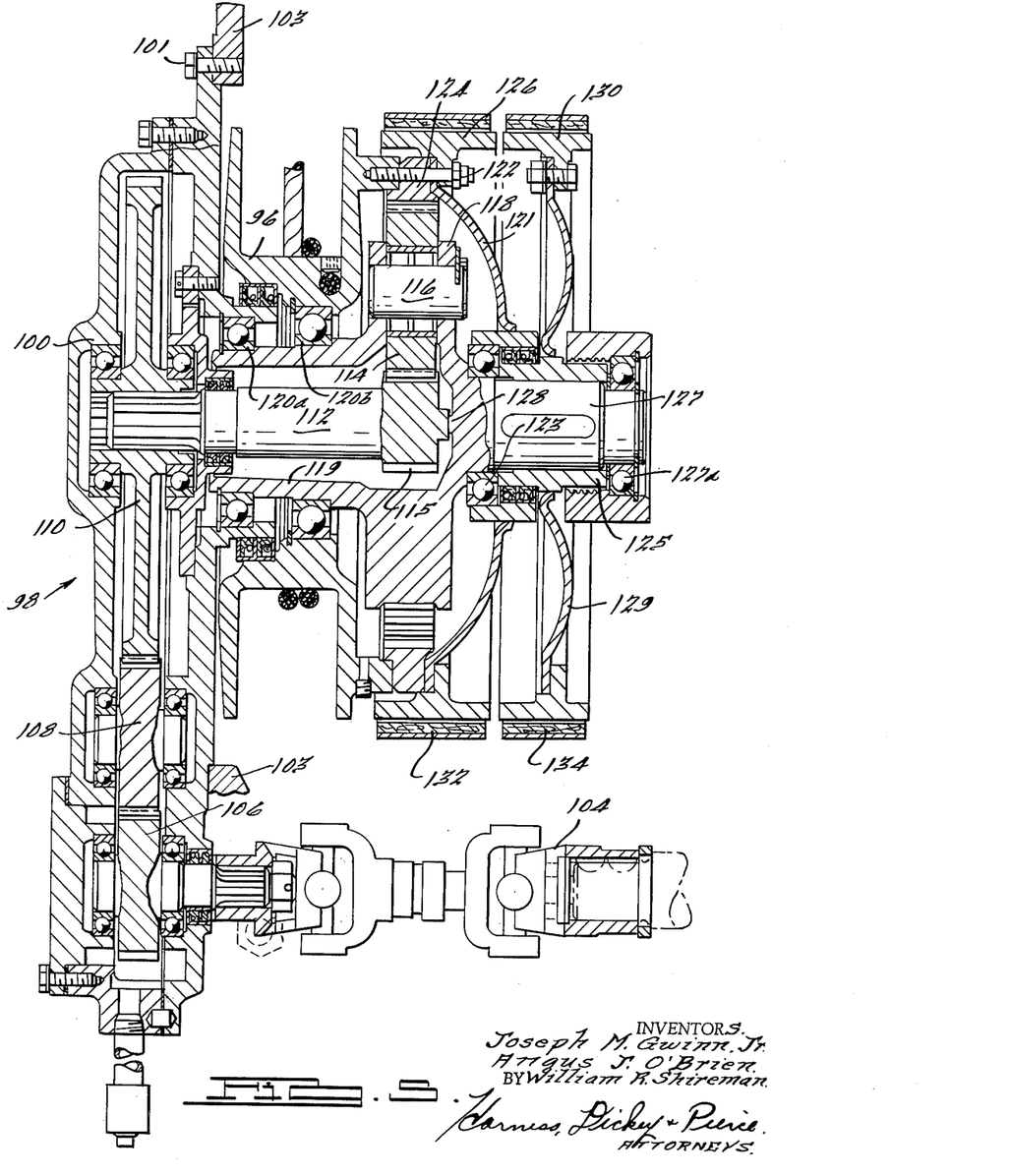
FIG. 5 is a sectional view looking along the line 5—5 in FIG. 4 and illustrating a power transmission mechanism for a cable and sheave power output in the unit of this invention.

With reference to FIG. 6, a single cable 86 has one of its ends secured to the block 72 carried by the sheave-supporting unit 52 for the tractor section 24. The cable 86 is then trained successively about the sheaves 84, 70, 82 and 68. From the sheave 68, the cable 86 extends downwardly and is trained about a sheave 88 rotatably supported on a shaft 90 extended longitudinally of the tractor section 24. The shaft 90 is supported on a front housing section 48 which is bolted to the main part 46 of the housing 42. The cable 86 extends transversely of the tractor from the sheave 88 to a corresponding sheave 92 similarly secured to a front section 48 for the housing 44 for rotation about a shaft 94 extended longitudinally of the tractor section 22. The cable 86 then extends upwardly and is successively trained about the sheaves 66, 84, 64, 82 and 60. From the sheave 60, the cable 86 extends downwardly and is wound about and secured to a drum 96 which forms a part of a power transmission mechanism 98 (FIG. 5), the moving parts of which are enclosed within the housing 44.

It is to be noted that the only function purpose for the housing sections 48 is to support the sheaves 88 and 92 which are required to transfer the cable 86 from one tractor section to the other in the twin-type tractor illustrated so that the weight of the blade 34 is divided between the tractor sections 22 and 24. In an installation of the control unit 20 on a conventional single engine tractor only a single housing part 46 can be used and the front part 48 therefor can be eliminated to conserve space between the tractor and the dozer blade, if desired. In a cable control unit on a single-engine tractor only one upper sheave supporting unit 52 is used since only a single housing or nose guard 44 is required, and only one sheave-supporting unit 74 is used on the dozer blade. In such case, the cable 86 is trained about the sheaves in substantially the manner illustrated in the right hand portion of FIG. 6, with an anchor block 72 being substituted for the sheave 66 and the cable 86 terminating at the anchor block. It is apparent that finer adjustments of the dozer blade may be obtained by using a longer cable 86 and using additional upper sheaves like the sheave 64 and additional lower sheaves like the sheaves 84.

Figures 2, 3:
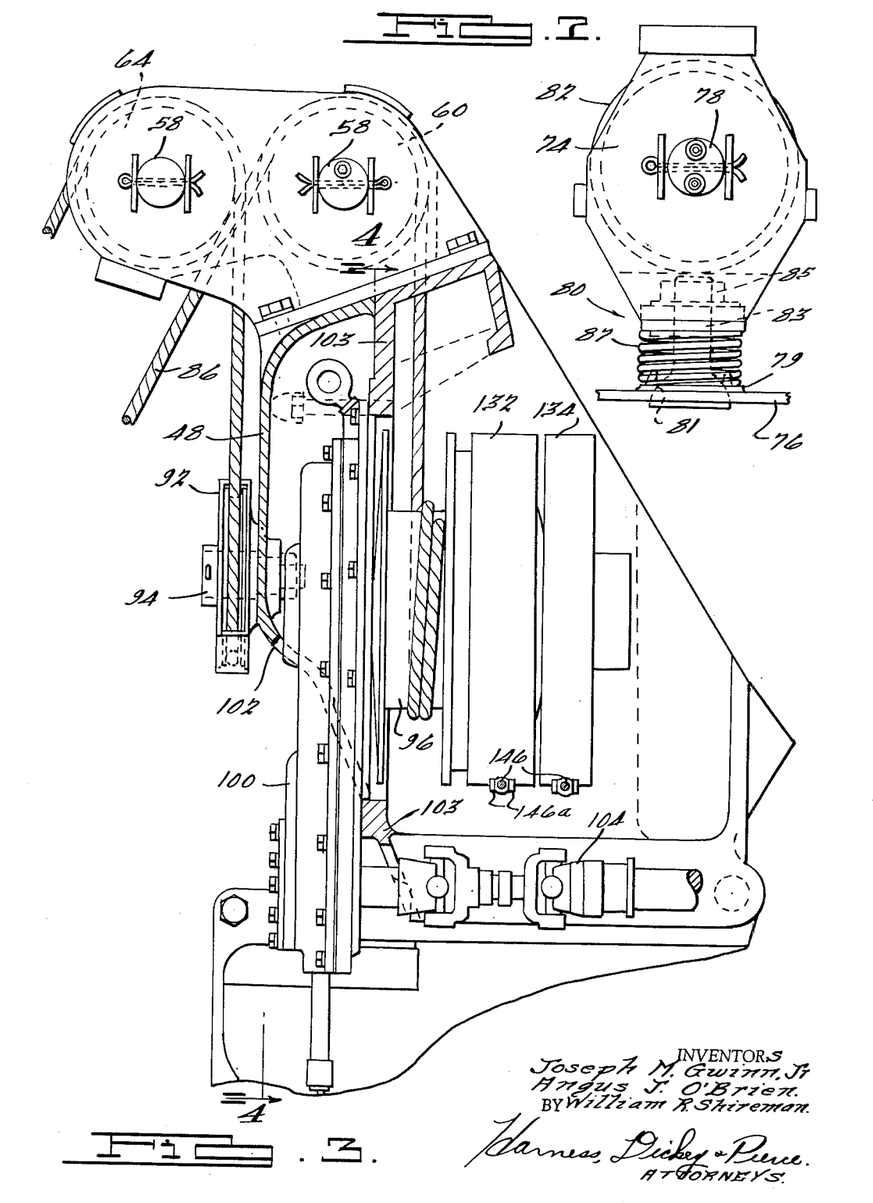
FIG. 3 is an enlarged sectional view looking substantially along the line 3—3 in FIG. 1.
Figure 3:
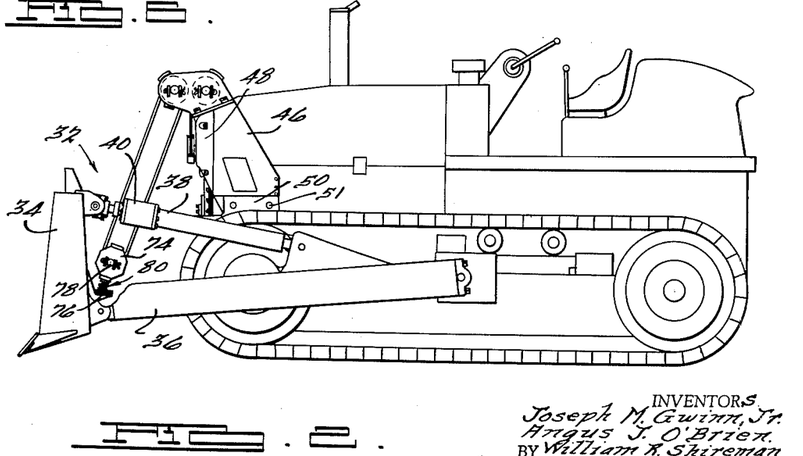
Figure 4:
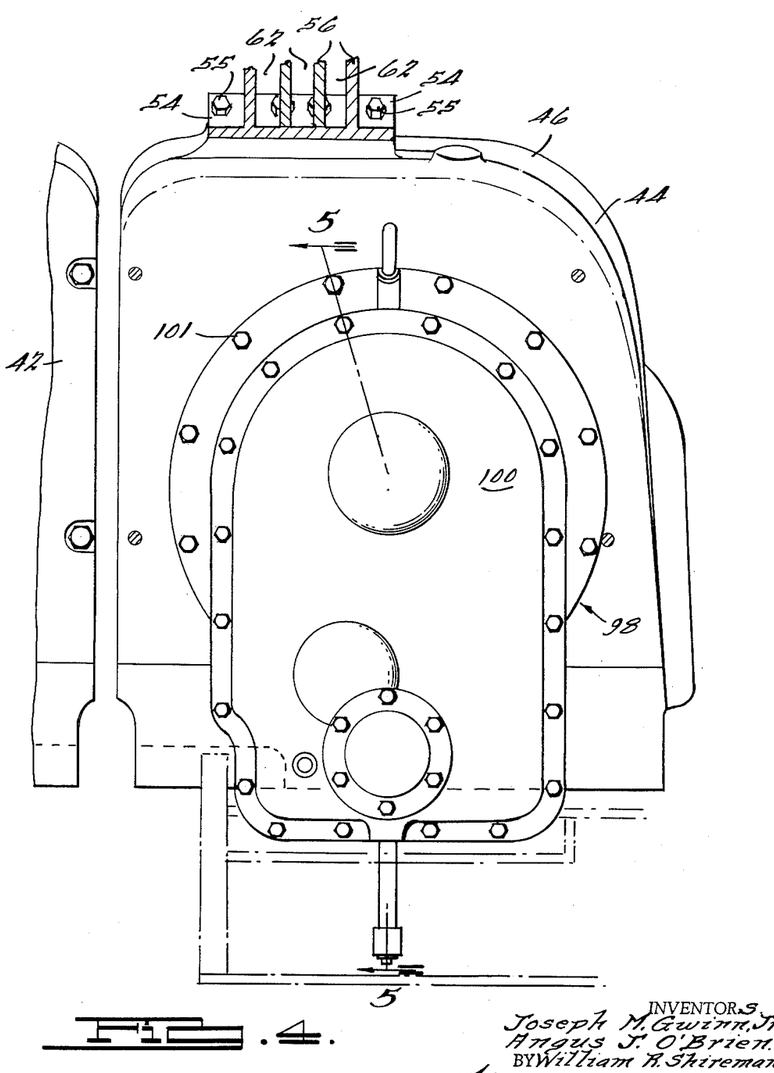
FIG. 4 is a transverse sectional view looking along the line 4—4 in FIG. 3.

As best appears in FIG. 3, the drum 96 extends rearwardly from a gear casing 100 which is mounted on the front open end of the main part 46 for the housing 44. As shown in FIGS. 3 and 4, the casing 100 extends completely across the open front end of the housing part 46 so that it functions as a cover for the part 46, and is connected to an inwardly extending flange 103 (FIGS. 3, 4 and 5) on the part 46 by bolts 101. The mechanism 98 is driven from a power input shaft 104 which is in turn driven from the engine 29 corresponding to the housing 44. The shaft 104 is releasably connected to and drives a gear 106 within the casing 100, which in turn operates through a second gear 108 to drive a larger gear 110 connected to the front end of a floating shaft 112 extended longitudinally of the tractor 21.

The shaft 112 carries a sun gear 115 arranged in meshing engagement with several planet gears 114 (only one of which is shown) which are mounted on pivots 116 on a planet carrier frame 118. As best appears in FIG. 5, the frame 118 has a forwardly extending tubular portion 119 positioned about the shaft 112 and supported on a bearing 120a on the casing 100. The frame 118 also has a rearwardly directed cylindrical portion 127 aligned with the shaft 112 and supported on a bearing 127a. The drum 96 is mounted on a bearing 120b carried by the cylindrical portion 119 of the carrier frame 118 and, as will more clearly appear hereinafter, on a bearing 123 positioned about the frame portion 127. The drum 96 is secured by means of bolts 122 to a ring gear 124 which meshes with the planets 114 and carries an encircling brake drum 126. An annular inwardly and rearwardly extending disk 121 attached to the gear 124 by the bolts 122, and thus connected to the drum 96, is rotatably supported on the bearing 123 extending about the cylindrical carrier portion 127 which has a front end section 128 which serves as a thrust support for the rear end of the shaft 112. A tube 125 secured to the carrier portion 127 carries an outwardly extended disk 129 which in turn supports an encircling drum 130 arranged adjacent and in a coaxial relation with the drum 126. The drums 126 and 130 are hereinafter referred to as the "brake drum" and the "clutch drum," respectively.

For operating the mechanism 98, a brake band 132 and a clutch band 134, corresponding to the drums 126 and 130 are arranged in an encircling relation with the drums 126 and 130, respectively.

Figures 8, 9, 10:
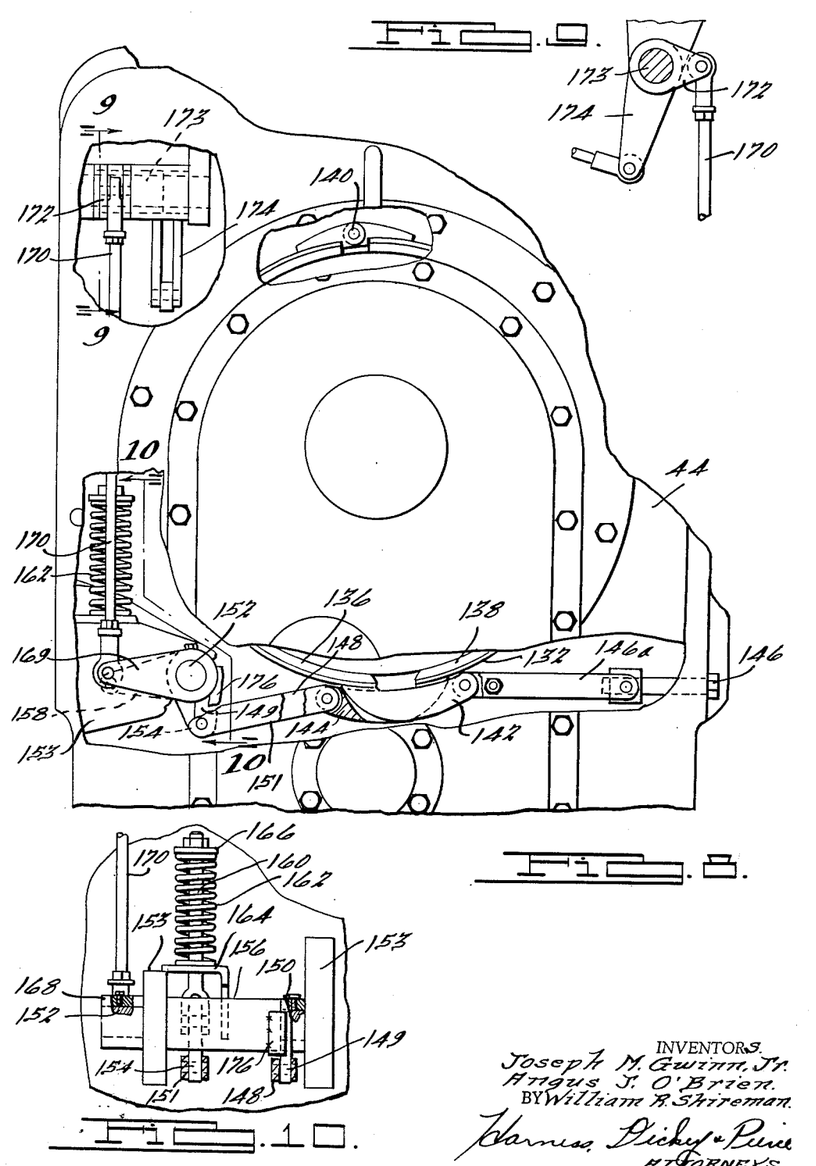
FIG. 8 is a fragmentary front elevational view of one of the control unit housings, with some parts broken away and other parts shown in section for the purpose of illustrating the brake and clutch band operating mechanism in the power transmission mechanism shown in FIG. 5.
FIGS. 9 and 10 are fragmentary sectional views looking along the lines 9—9 and 10—10, respectively in FIG. 8.

The bands 132 and 134 are similar in construction and, as best appears in FIG. 8, each is formed in two sections 136 and 138, pivotally connected at their upper ends by a pivot member 140 and connected at their lower ends to a corresponding pair of links 142 and 144. The link 142 is connected by means of another link 146a and a bolt 146 to the housing 44. The link 144 is of a bifurcated construction having legs arranged on opposite sides of the link 142. The link 144 for the clutch band 134 is connected by means of a rod 148 to an ear 149 mounted on a sleeve 150 which is secured to a shaft 152 mounted on trunnions 153 secured to the housing 44 and arranged to one side of the mechanism 98. On rotation of the shaft 152 in a clockwise direction as viewed in FIG. 8, the band 134 is tightened about the drum 130.

The link 144 for the brake band 132 is connected by another link 151 to an ear 154 formed on a sleeve 156 rotatably supported on the shaft 152. A second ear 158 secured to the sleeve 156 is connected to the lower end of a bolt 160 which carries a spring 162 arranged in compression between a mounting bracket 164 on the housing 44 and a washer 166 positioned on the bolt at the upper end thereof. Thus, the spring 162 operates to continually maintain the brake band 132 in holding engagement with the brake drum 126. A sleeve 168 fixed on the front end of the shaft 152 carries a lever 169 connected to the lower end of an upright rod 170 which is in turn connected at its upper end to an arm 172 mounted on a shaft 173 rotatably supported by the housing 44.

A second arm 174 carried by the shaft 173 is adapted to be connected to a manual or power operated mechanism (not shown) for moving the rod 170 up or down as desired. A counterclockwise rotation of the arm 172, whether effected by power or manually operated means, is effective to raise the rod 170 to in turn rotate the shaft 152 to tighten the clutch band 134 about the clutch drum 130 and hold the drum 130 against rotation.

When the clutch drum 130 is held in a stationary position by the band 134, the planet carrier 118 is held so that the pivots 116 function as fixed pivots for the gears 114. As a result, the rotating shaft 112 is effective to rotate the planet gears 114, and in turn the ring gear 124 in a counterclockwise direction when viewed from the front of the tractor to in turn rotate the drum 96 and raise the dozer blade 34. Whenever the operating force on the arm 172 is discontinued, a spring (not shown) associated with the band 134 provides for an expansion of the band 134 so that rotation of the drum 96 to raise the dozer blade 34 is discontinued.

It is to be noted that during raising of the dozer blade 34, the application of the brake band 132 to the brake drum 126 is not discontinued. A release of the pressure of the band on the brake drum 126 is not necessary since, as best appears in FIG. 8, the frictional force of the drum 126 on the band 132 is in a direction corresponding to the direction of rotation of the drum 126 and opposite to the direction of application of the force which applies the band 132, namely, the force exerted by the spring 162. As a result, the total force exerted by the band 132 on the drum 126 resisting drum rotation is at a minimum. Accordingly, it is not necessary to discontinue this brake force on the brake drum 126 during raising of the blade 34.

On the contrary, when the drum 96 for the cable 86 is rotated in a direction for lowering the dozer blade 34, namely, clockwise as viewed from the front of the tractor, the frictional force of the drum 126 on the band 132 is in a direction corresponding to the direction of the operating force on the band 132 so that the frictional band force on the drum 126 increases as the torque on the drum 126 is increased with the result that rotation of the drum 126 is restrained.

It can thus be seen that once raising movement of the dozer blade 34 is discontinued, the brake band 132 operates automatically and immediately to prevent any accidental lowering of the blade 34 and to maintain the blade at a moved position.

To lower the blade, the arm 174 is rotated in an opposite direction to rotate the shaft 152 in a counterclockwise direction as viewed in FIG. 8. In response to such rotation, the ear 149 on the sleeve 150 engages an overlapping stop 176 on the sleeve 156. The stop 176 overlaps the sleeve 150 so as to be in the path of the ear 149 to provide for a concurrent rotation of the sleeve 156 and the ear 154 to discontinue the force of the brake band 132 on the brake drum 126. Consequently, both the bands 132 and 134 are released so that the drum 96 and the ring gear 124 are free to rotate in response to lowering of the blade 34 under the action of its own weight.

It is to be understood that any operative structure can be provided for applying the brake and clutch bands 132 and 134 as required to effect the desired rotation or holding of the drum 96, the lever mechansim previously described being only an illustrated form of a preferred structure. In any event, the housing 44 is formed so that the band operating structure is readily applied thereto and removed therefrom. The trunnions 153, bracket 164 and the supporting plates or brackets for the shift 173 are mounted on bolt pads provided on the housing so that these parts can readily be attached thereto.

It can thus be seen that the mechanism 98 is readily operable to provide for rotation of the drum 96, which with its associated operating structure constitutes a winch, to thus provide in turn for a selective raising and lowering of the dozer blade 34. By virtue of the mounting of the housings 42 and 44 on the engine supporting tractor frame portions 26a, the unit 20 may be quickly assembled with the tractor 21 at a position to avoid interference from dirt, rocks and the like, which may pile up at the front end of the tractor. Furthermore, the casing 100 and the hollow housing part 46 cooperate to completely enclose the moving parts of the mechanism 98, which are subject to clogging with dirt and the like, and function as a nose guard for the tractor.

The disposition of the sheaves on the supporting units 52 in planes extended longitudinally of the tractor provides for a minimum of interference of the sheaves with the tractor operator's vision. The unit 20 is readily installed in the field since it is only necessary to mount the two housings 42 and 44 and the two sheave-supporting units 74 on the tractor and the blade, respectively. The arrangement of the housings so that they are mounted by means of the releasable pins 51 carried by the mounting plates 50 further simplifies the assembly of the housings with the tractor 21. The power transmission mechanism is readily removed as a unit from the housing support 46 by merely removing the bolts 101, moving the bands 132 and 134 out of engagement with the drums 126 and 130, and moving the mechanism forwardly out of the housing 46. Once removed, it is just as quickly replaced by re-inserting the bolts and by virtue of its pre-assembled construction can be repaired and tested in the shop or factory. If removal of the actuating structure for the power transmission mechanism, which consists of the bands 132 and 134 and their operating structure is desired, for example, when replacing the unit 20 with a hydraulic unit to be hereinafter described, the trunnions 153, the bracket 164 and the supporting-plates for the shaft 173 are detached from their bolt pads and removed.

Figures 11, 12:
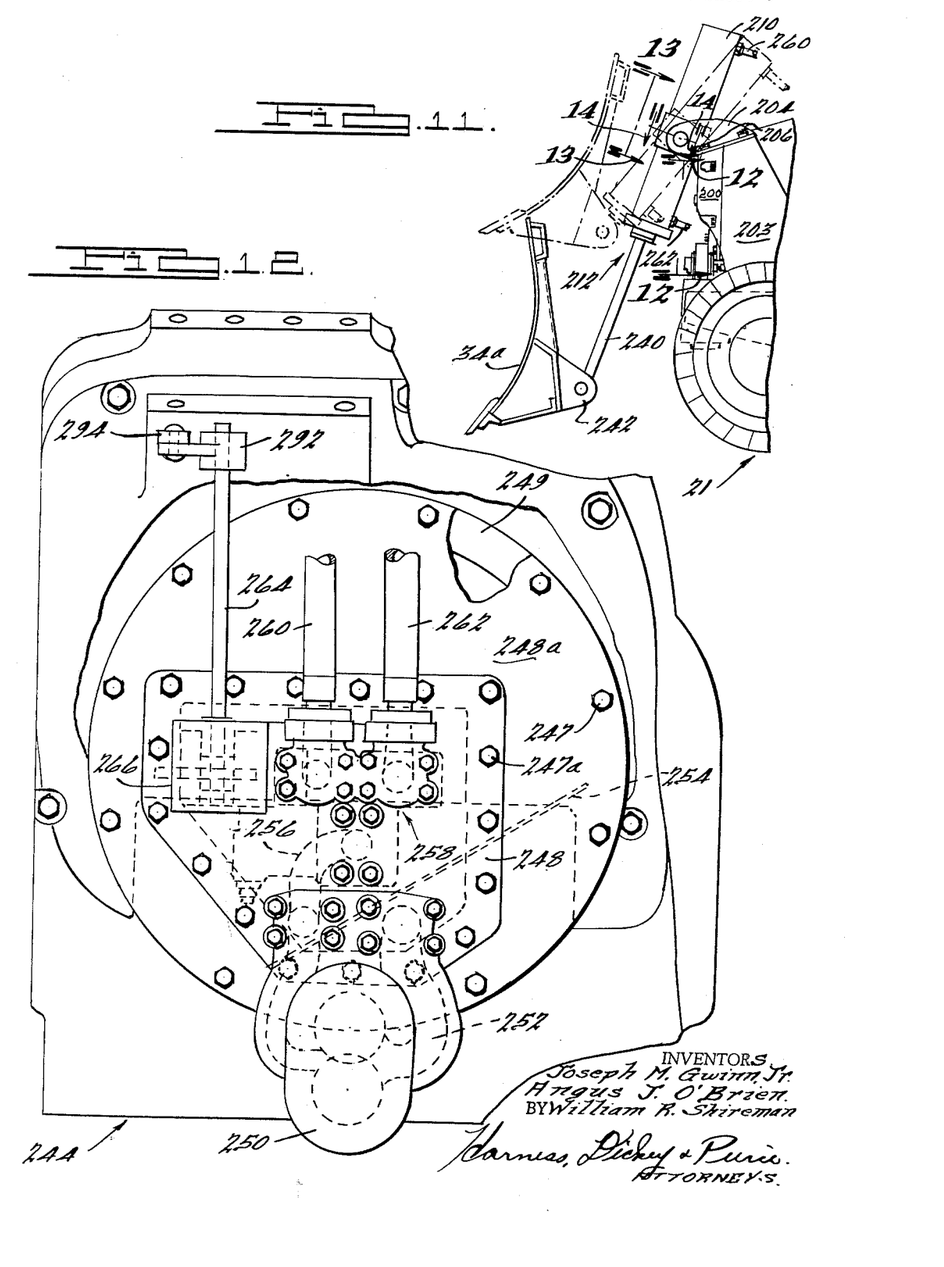
FIG. 11 is a foreshortened side elevational view, illustrated similarly to FIG. 2, of a crawler tractor provided with a second form of the power control unit of this invention in which a hydraulic cylinder assembly type power output is utilized.
FIG. 12 is an enlarged fragmentary view looking substantially along the line 12—12 in FIG. 11.

A second form of the control unit of this invention indicated generally at 200, is illustrated in FIG. 11 mounted on the tractor 21. The unit 200 includes a pair of housings 202 and 203 identical to the corresponding housings 42 and 44 used in the control unit 20. The housings 202 and 203 are provided on their top sides with a pair of corresponding brackets 204 (only one of which is shown in FIG. 11), releasably connected to the housings by means of bolts 206 and having forwardly projected upright plate portions 208 (FIG. 14) arranged forwardly of and above the housings 202 and 203. The plate portions 208 are spaced apart, in a direction transversely of the tractor 21, a distance to receive therebetween a cylinder 210 for a hydraulic cylinder and piston assembly, indicated generally at 212. As will clearly appear hereinafter, in this embodiment of the invention the front part, corresponding to the parts 48 in the unit 20, of each of the housings 202 and 203 serves no functional purpose and is readily omitted if additional space is required between the tractor front end and the blade 34a.

The cylinder 210 has stub shafts 214 secured thereto and positioned in a plane extended substantially longitudinally of the tractor. A pair of castings 216, of complementary shapes, have cooperating yoke portions 218 which straddle transversely opposite sides of the cylinder and are releasably connected by bolts 220 arranged on opposite sides of the cylinder for moving diagonally inclined meeting faces 222 on the castings 216 into abutting engagement. When connected, the castings 216 form bearing supports for rotatably supporting the shafts 214 on the cylinder 210. The castings 216 are provided with corresponding stub shafts 226 which are axially aligned in the connected position of the castings and positioned substantially perpendicular to the shafts 214 in a plane extended substantially transversely of the tractor 21.

Each of the stub shafts 226 is rotatably supported in an annular bushing 230 having a spherical outer surface 232 and supported in a complementary spherical inner surface 234 formed on a bearing sleeve 236 supported in a cavity 237 in the corresponding plate portion 208. In mounting the cylinder 210, the castings 216 are first manipulated so that the stub shafts 226 are rotatably supported within the bushings 230 following which the castings 216 are bolted together. The castings 216 cooperate with the stub shafts 214 to provide a gimbal-type support for the cylinder 210. In other words, the cylinder 210 is readily rotatable about the axis of the stub shafts 226 on raising and lowering of the dozer blade 34a, as illustrated in FIG. 11, and is readily rotatable about the axis of the stub shafts 214 in response to deflection of the blade 34a in a direction transversely of the tractor in response to load. It is apparent that the loads applied to the blade 34a are seldom uniformly distributed along the blade and as a result, some side deflection of the blade is inevitable. In response to such deflection, the cylinder 210 merely pivots about the shafts 214 so as not to unduly strain any of the structural parts of the blade 34a, its supporting structure or the cylinder assembly 212.

During relative up and down movement of the tractor sections 22 and 24, the bushings 230 readily tilt with respect to the sleeves 236 by virtue of the complementary curved surfaces 232 and 234 so as not to prevent the desired relative movement of the parts. Furthermore, the distance between the plate portions 208 increases and decreases and the stub shaft 226 for the housing 202 merely slides in its bushing 230 when this distance changes. A shoulder 239 provided on the terminal end of the stub shaft 226 corresponding to the housing 203 prevents accidental movement of the stub shaft 226 out of its bushing 230.

During the shipment of the tractor 21 in the separate sections 22 and 24, which is required because of the size of the tractor 21, the attachment 200 is readily maintained intact on the section 22 having the housing 203. Since the power transmitting mechanism for the unit 200 is also supported on the housing 203, in a manner hereinafter described, when the sections 22 and 24 are connected after shipment, no hydraulic connections are required.

The piston and cylinder assembly 212 includes the usual piston rod 240 which is pivotally connected at its lower end to a plate 242 provided on the rear end of the dozer blade 34a. As a result, on retraction of the piston rod 240 relative to the cylinder 210, the blade 34a is readily raised relative to the tractor 21. Conversely, on extension of the piston rod 240, the blade 34a is lowered as shown in FIG. 11.

It is seen, therefore, that in response to actuation of the single hydraulic cylinder and piston assembly 212 the dozer blade 34a is readily raised and lowered as desired. For actuating the assembly 212, a power transmitting mechanism consisting of a hydraulic pump, tank and valve assembly 244 (FIGS. 12 and 15) is mounted in the housing 203 and extends downwardly through an opening 205 in the front housing part. The assembly 244 includes a tank 246 having a front cover plate 248a which constitutes the front side of the tank 246 and is connected thereto by bolts 247a. A series of bolts 247 connect the cover plate 248a to an annular inwardly directed flange 249 on the housing 203, similar to the corresponding flange 103 on the housing 44. The cover plate 248a thus closes the open front end of the main housing part and provides for omission of the housing front part if desired.

An adapter casting 248 mounted on the cover plate 248a by bolts 247a carries a pump 250, which may be of gear type, arranged in a driven relation with the engine operated shaft 104 described in connection with the unit 20. The pump 250 has an intake passage 252 (FIG. 12) communicates with the tank 246 at a position below an inclined baffle 254 mounted in the tank. An outlet passage 256 for the pump 250 communicates at its upper end with a spool type valve, of well known type, indicated generally at 258, above the baffle 254.

The valve 258 controls the supply of fluid under pressure to a pair of flexible fluid lines 260 and 262 which communicate with the upper and lower ends, respectively, of the cylinder 210 on opposite sides of the piston (not shown) in the cylinder. An upright control shaft 264 for the valve 258 is rotatably supported at its lower end in a bracket 266 on the adapter casting 248 and is operable on rotation to move the valve 258 between the various operating positions therefor.

Figures 13, 14, 15, 16:
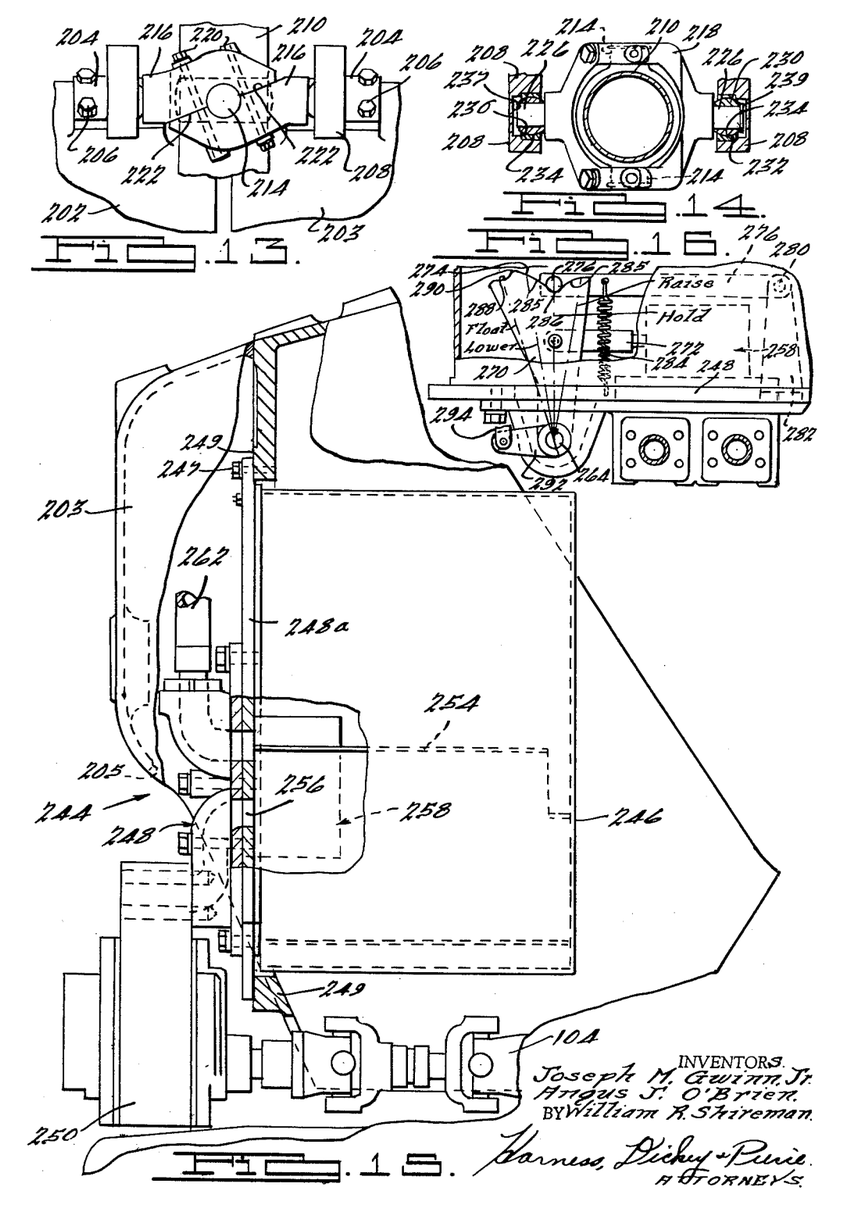
FIG. 13 is a fragmentary elevational view, looking substantially along the line 13—13 in FIG. 11, of a portion of the structure which supports the hydraulic cylinder assembly in the unit shown in FIG. 11.
FIG. 14 is a transverse sectional view looking along the line 14—14 in FIG. 11.
FIG. 15 is a fragmentary side elevational view of the structure shown in FIG. 12.
FIG. 16 is a fragmentary top plan view of a portion of the structure illustrated in FIG. 15, with some parts broken away and other parts shown in section for the purpose of clarity.

As illustrated in FIG. 16, the valve 258 is movable between what are hereinafter termed "float," "lower," "hold" and "raise" positions, which positions are defined by the position of a plate 270 secured to the control shaft 264 and extended rearwardly therefrom. The plate 270 is pivotally connected to a spool control member 272 which in turn moves the valve 258 between the control positions thereof. The rear or terminal end 274 of the plate 270 is of an irregular shape and acts as a cam surface which cooperates with a cam follower or roller 276 to define the control positions of the shaft 264.

As best appears in FIG. 16, the follower 276 is mounted on one end of a rod 278 which is pivotally supported at its opposite end at 280 on an ear 282 secured to the adapter casting 248. A spring 284 extends between the rod 278 and the casting 248 for resiliently maintaining the follower 276 in engagement with the cam surface 274, which is formed with two rearwardly diverging portions 285 so that it has an intermediate point 286 between tween the portion 285 which is termed the low point on the surface 274. When the follower 276 is opposite the low point 286, the valve 258 is in its "hold" position preventing fluid flow in either of the lines 260 or 262. It is apparent that the spring 284 provides for an automatic movement of the plate 270 to this position when the operating force on the control shaft 264 is discontinued.

To maintain the valve 258 in either a "raise" or a "lower" position, in which positions the follower 276 is on opposite sides of the low point 286, a continued operating force must be maintained on the control rod 264. To move the control rod 258 into a "float" position in which no pressure is applied through either of the lines 260 and 262, so that the blade 34a is free to move up and down, the plate 270 must be moved to a position in which the follower 276 is within a pocket 288 at one end of the cam surface 274. In order to move the plate 270 to this position, the follower 276 must first travel over a projection 290 formed on the cam surface 274 adjacent the pocket 288. Thus, the projection 290 imparts "feel" to the operator to indicate that the "float" position of the valve 258 is being approached. An arm 292 secured to the upper end of the control shaft 264 is preferably linked by a connecting structure 294, which is only partially shown, to an operating lever adjacent the operator's seat on the tractor 21 so that the valve 258 can be conveniently operated.

In the operation of the tractor 21 with the control unit 200, the dozer blade 34a is normally maintained at a desired position to which it has been previously moved by automatically maintaining the valve 258 in the "hold" position. To raise the blade 34a, the control rod 264 is rotated in one direction to move the valve 258 to a position in which fluid under pressure is supplied to the line 262 and fluid is exhausted from the line 260 to the tank 246 at a position above the baffle 254. By virtue of this discharge of fluid above the baffle 254, the turbulence of the fluid is not transmitted to the fluid which is supplied to the pump intake 252 below the baffle 254. When raising movement of the blade 34a is to be discontinued, the operating force on the control rod 264 is discontinued so that the valve automatically moves to the "hold" position corresponding to a position of the cam follower 276 opposite the low point 286 on the cam face 274. To lower the blade 34, the control rod 264 is rotated in a reverse direction so that the fluid under pressure is supplied through the line 260 to the cylinder 210. On movement of the plate 270 past the "lower" position to a "float" position, no pressure is supplied through either of the lines 260 and 262 so that the blade 34a is free to move up and down with the contour of the ground. Such a blade control is used, for example, during back filling operations with the tractor 21.

The previously enumerated advantages for the unit 20 are equally applicable to the unit 200, which is also readily installed as a package either in the field or at the factory by virtue of the construction of the housing 203 and the power transmission mechanism 244 for ready assembly. It is only necessary to mount the housings 202 and 203 which is readily accomplished with mounting plates and pins like the plates 50 and pins 51 previously described, and connect the piston rod 240 to the dozer blade 34a. Furthermore, by virtue of the gimbal-type mounting for the hydraulic cylinder assembly 212, any up and down tilting or sideways deflection of the blade 34a does not interfere with the proper functioning of the assembly. The location of the valve 258 and all of the circuitry for the hydraulic system in the casting 248 eliminates field connections and makes replacement of this structure relatively easy from an assembly standpoint. All of this structure is combined in a single bench assembly which can be tested at the plant.

As a result of the mounting of the housings 202 and 203 and the fact that they are identical with the housings 42 and 44 in the unit 20, a hydraulic control unit 200 is readily converted to a cable control unit 20 and vice versa. The bolt patterns on the main portions of the housings 44 and 203 for receiving the mounting bolts 101 and 247 are the same so that either type unit is readily mounted on a housing. Further, the openings 102 and 205 are substantially the same so that the housing front parts, when they are used, do not interfere with the interchangeability of the control units. When the front parts are omitted, the sheave supporting units 52 and brackets 294 are cantilever-supported on the main housing parts. As previously pointed out, the units 20 and 200 have for convenience been particularly described only with respect to their assembly with the twin-type tractor 21, and both units are readily adapted to the conventional tractor having a single main frame and a single engine. In a hydraulic control unit on a single-engine tractor both of the supporting brackets 204 for the supporting shafts 226 on the cylinder 210 are supported on the single housing 203 which is used.

Although the invention has been described with respect to a preferred embodiment thereof, it is to be understood that it is not to be so limited, since changes can be made therein which are within the scope of the invention as defined by the appended claims.

What is claimed is:

1. In combination with a tractor having a main frame, propelling engine means on said frame adjacent the front end thereof, and a work attachment movably mounted on the tractor forwardly thereof, a housing having an open front end mounted on said main frame at the same level and forwardly of said engine means, said housing including means thereon adapting the housing for detachably supporting power output means for moving said work attachment, means on the front end of said housing for detachably supporting a power transmission mechanism connectible to said engine means and said output means to operate the output means, and a pre-assembled power transmission mechanism having a front cover portion releasably mounted on said housing means so as to substantially close said housing when said mechanism is disposed therein.

2. A power control unit for a tractor having a main frame, an engine mounted on a portion of said frame and a work attachment movably mounted on said tractor, said unit comprising housing means mounted on said tractor frame portion adjacent said engine, a hydraulic piston and cylinder assembly pivotally mounted on said tractor for swinging movement about an axis extending transversely of the tractor, means operatively connecting said hydraulic assembly and said work attachment to provide for raising and lowering of said attachment in response to actuation of said assembly, and a pre-assembled hydraulic pump, valve and tank mechanism detachably supported on and substantially enclosed within said housing means for operation by said engine to actuate said hydraulic cylinder assembly.

3. In combination with a tractor having a main frame, propelling engine means on said frame, and a work attachment movably mounted on the tractor, a housing mounted on said main frame, a hydraulic piston and cylinder assembly movably mounted on said tractor and connected to said work attachment, said assembly having a piston rod and being operable to move said attachment in opposite directions on extension and retraction of said piston rod, a pre-assembled power transmission unit comprising a tank positioned in said housing and having a supporting plate removably mounted on said housing, a pump supported on said plate in communication with said tank and connected to said engine for driving thereby, control valve means supported on said plate and connected to said pump and said cylinder and communicating with said tank, and fluid passage means formed in said plate for fluid communicating said valve, tank and plate.

4. For use with a tractor having a main frame, propelling engine means on said frame, and a work attachment movably mounted on said frame, housing means mounted on said main frame at a position horizontally adjacent said engine means, a pre-assembled control valve, pump and tank unit removably mounted on said housing means and connected to the engine means for operation of the pump thereby, hydraulic cylinder and piston means mounted on said housing means and connected to said valve for operation in response to actuation of said assembly, and means for connecting said hydraulic cylinder and piston means to said work attachment for moving the attachment.

5. For use with a twin-type tractor having a pair of pivotally connected side by side frames, each of which has propelling engine means mounted thereon adjacent the front of said tractor, a power control unit mounted on the tractor for raising and lowering work attachments for said tractor, said unit including a pair of housing members mounted on said frames at positions forwardly of said engine means, a mounting flange on the front end of one of said housing members, a pre-assembled power transmission unit having a cover portion removably supported on said flange so as to substantially close said one housing, said transmission unit being connected to one of said engine means for operation thereby, and power output means mounted on said housings and operatively associated with said power transmission means for operation in response to operation of said transmission means.

6. In combination with a tractor having a main frame, propelling engine means on said frame adjacent the front end thereof, and a work attachment movably mounted on the tractor forwardly thereof, a housing having an open front end mounted on said main frame forwardly of said engine means, a pre-assembled power transmission unit extending within said housing, said unit having a front cover portion removably connected to the front end of said housing so as to substantially close the housing, said unit comprising winch means mounted on said cover portion and disposed within said housing, means connected to said winch means and said engine for driving the winch means in one direction, first sheave means removably mounted on said housing, second sheave means mounted on said work attachment, and a cable wound about said winch means and said first and second sheave means for raising said work attachment on movement of said winch means in said one direction.

7. In combination with a twin-type tractor having a pair of pivotally connected side by side main frames, propelling engine means mounted on said frames adjacent the front ends thereof, and a tractor work attachment movably mounted on said frames at a position forwardly thereof, a pair of housings mounted on said main frame forwardly of said engine means, a hydraulic piston and cylinder assembly having a cylinder and a piston rod connected to said work attachment, means on said cylinder providing a pair of stub shafts projecting from transversely opposite sides thereof, co-acting ball and socket means on said stub shafts and said housings providing for a movable support of the stub shafts on the housings so that the ball and socket means are movable in response to relative up and down movement of said tractor frames to maintain the cylinder in a predetermined position, one of said stub shafts being mounted for sliding movement relative to its corresponding ball and socket means, and a power transmission unit supported on one of said housings and connected to said hydraulic cylinder assembly for retracting and extending said piston rod to raise and lower said work attachment.

8. In combination with a tractor having a main frame, propelling engine means mounted on said main frame adjacent the front end thereof, and a work attachment movably mounted on the tractor forwardly thereof, a housing mounted on said main frame forwardly of said engine means, said housing including means on the upper end thereof adapting said housing for supporting a sheave unit, a pre-assembled power transmission unit releasably mounted on and extended within said housing, said unit comprising winch means disposed in said housing, means connected to said engine and operatvely associated with said winch means for driving the winch means in one direction, sheave means on said work attachment, a cable trained about said winch means, said sheave unit and said sheave means for raising the work attachment on rotation of said winch means in said one direction, brake band means in said housing engageable with a portion of said winch means for holding the winch means in a rotated position, said band means being movable to a position in a clearance relation with said unit when said unit is to be removed from the housing.

References Cited in the file of this patent
UNITED STATES PATENTS

| | | |
|---|---|---|
| 2,529,299 | LeTourneau | Nov. 7, 1950 |
| 2,678,105 | Peterson | May 11, 1954 |
| 2,682,717 | LeTourneau | July 6, 1954 |
| 2,766,536 | Perkins | Oct. 16, 1956 |
| 2,787,065 | Bock et al. | Apr. 2, 1957 |
| 2,921,392 | Bidwell | Jan. 19, 1960 |

FOREIGN PATENTS

| | | |
|---|---|---|
| 654,273 | Great Britain | Oct. 25, 1950 |

UNITED STATES PATENT OFFICE
CERTIFICATE OF CORRECTION

Patent No. 3,031,779

May 1, 1962

Joseph M. Gwinn, Jr., et al.

It is hereby certified that error appears in the above numbered patent requiring correction and that the said Letters Patent should read as corrected below.

Column 4, line 10, for "function" read -- functional --; column 6, line 28, for "shift" read -- shaft --; line 66, for "replacting" read -- replacing --; column 7, line 67, strike out "the", first occurrence; column 8, line 31, before "communicates" insert -- which --; line 64, strike out "tween"; column 12, line 44, for the foreign patent number "654,273" read -- 645,273 --.

Signed and sealed this 14th day of August 1962.

(SEAL)
Attest:

ERNEST W. SWIDER
Attesting Officer

DAVID L. LADD
Commissioner of Patents